June 20, 1967     J. E. PERRUZZI     3,326,233

BI-DIRECTIONAL VALVE

Filed April 30, 1964

INVENTOR.
JOHN E. PERRUZZI
BY
ATTY.

United States Patent Office 3,326,233
Patented June 20, 1967

3,326,233
BI-DIRECTIONAL VALVE
John E. Perruzzi, 6030 Logan Way, Apt. A–1,
Bladensburg, Md. 20710
Filed Apr. 30, 1964, Ser. No. 364,044
3 Claims. (Cl. 137—460)

The invention described herein may be manufactured and used by or for the Government of the United States of America for governmental purposes without the payment of any royalties thereon or therefor.

The present invention relates to a bi-directional valve, and more particularly to one which provides bi-directional flow regulation automatically and in addition, operates as a check valve in either flow direction.

In fluid systems it has been the general practice to employ automatic check valves to prevent flow reversal and pressure-sensitive transducer controlled valves to regulate fluid flow. The disadvantages of the prior art arrangements are that in the case of check valves, they are only effective in one direction, e.g., they are only effective in preventing flow reversal and are not responsive to excessive flow. In the case of transducer controlled valves, control is exercised remotely and the valves are not of simple construction and thereby difficult to manufacture.

The general purpose of this invention is to provide a bi-directional valve which embraces all the advantages of similarly employed check valves and transducer controlled valves and possesses none of the aforedescribed disadvantages. To attain this, the present invention contemplates a unique arrangement of a valve chamber of varying cross-section combined with a valve element which for purposes of explanation is herein referred to as a float, which together form an automatic bi-directional valve. The valve functions as both a check valve and as a flow regulator whereby the need for remote control of the valve is eliminated.

The present invention may be used in high pressure systems where the flow increase due to a rupture in the line would be dangerous. By its own independent action, the valve automatically and instantaneously halts flow in either the forward or backward direction depending upon the direction of flow resulting from a rupture in the line. The device also has application as a flow regulator such as in piping systems wherein a predetermined amount of fluid is needed and therefore excess flow is less desirable than reduced flow or no flow. The valve of the present invention has general application as a check valve, control valve, or safety valve, depending on the need of the particular system.

An object of the present invention is the provision of a novel bi-directional valve for halting both flow reversal and excessive forward flow.

Another object of the invention is the provision of a novel valve which functions as a flow regulator in addition to functioning as a bi-directional check valve.

A further object is to provide a novel bi-directional valve wherein simplicity of design makes the valve adaptable to a wide range of engineering materials, therefore rendering it useful for varied applications.

Still another object is to provide a novel bi-directional valve which may be incorporated into fluid lines as either a permanent structure or as a replaceable unit.

Other objects and many of the attendant advantages of this invention will be readily appreciated as the same becomes better understood by reference to the following detailed description when considered in connection with the accompanying drawings wherein.

Figure 1:
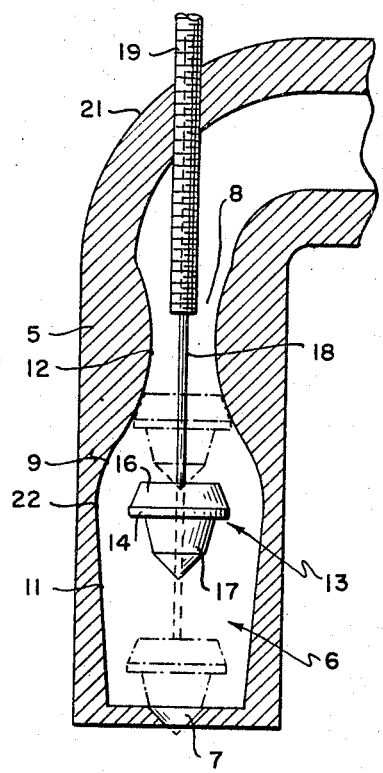
FIG. 1 is a view in longitudinal cross section of a valve according to one version of the present invention.

Referring now to the drawings, wherein like reference characters designate like or corresponding parts throughout the several views, there is shown in FIG. 1 an essentially vertically oriented housing 5 having an interior of varying cross-section, forming a valve chamber 6 with an inlet end 7 and an outlet end 8. The interior of inlet end is preferably frusto-conical in shape and forms a lower valve seat for the chamber 6. The chamber 6 is composed of a lower tapered tube portion 11 and adjacent thereto an upper Venturi portion 9. The outlet end 8 is formed by the upper portion of the Venturi 9 while the lower portion of the Venturi forms an upper valve seat.

The entrance of the valve chamber 6 is a tapered tube portion wherein the transverse cross-sectional area increases in the direction of flow. Fluidly coupled with, and directly above, the tapered tube portion 7, is the aforesaid Venturi portion 9. The Venturi 9 has a throat 12 and the inlet diameter of the Venturi is equal to and concentric with the outlet of the tapered tube portion 11. Thus, there is formed a vertical fluid passage which is geometrically, the shape of two fluid flow controlling chambers in series, a variable area chamber and a Venturi chamber.

A float member 13 having a cylindrical medial portion 14, and two oppositely tapering end portions 16 and 17 is adapted to move vertically within the valve chamber 6. The diameter of the medial portion 14 is less than the minimum diameter of tapered tube portion 11 but greater than the throat diameter of the Venturi portion 9. Float 13 has a weight greater than the weight of the fluid which it displaces in order that it may move vertically within the chamber 6 in response to the flow of fluid through the chamber. The upper end portion 16 of the float is shaped so as to seat in the lower portion of the Venturi 9 below the throat 12. When the flow exceeds a predetermined amount, the float 13, is lifted into the Venturi inlet and rapidly seats in throat 12, and the opposite end portion 17 is shaped so as to seat in the frusto-conical shaped inlet 7 of the valve chamber 6 when a flow reversal occurs. The float 13 is axially centered in chamber 6 by a guide rod 18 which is attached to the float and which is slidably mounted in a retractable hollow stem 19. The stem extends through a curved section of a pipe 21 which is connected to the outlet end of the valve. The stem 19 is vertically positionable in the throat 12 of Venturi portion 9 and, except when employed for unseating the float, is positioned above the throat. The guide rod 18 may be slidably mounted in the stem 19 by any suitable mounting means. The stem may also include a sealing arrangement for preventing the passage of fluid through the stem.

In operation, the rate of flow of fluid through chamber 6 determines the vertical position of the float 13 in the chamber. The tapered tube portion 11 and the float 13 are designed to permit the maximum desired flow when the float is positioned at the geratest diameter 22 of the tapered tube portion, as indicated in solid lines.

By the commonly known principle of flow through a Venturi tube, there is an increase in flow velocity from the entrance 22 to the throat 12 and a corresponding decrease of static pressure. With the float 13 at equilibrium, just at the entrance of the Venturi, and increase of flow will lift it into the influence of the Venturi pressure field and rapidly seat it as indicated in dashed lines, thus stopping flow. The float is guided in its vertical movement by the guide rod 18 which slides in the retractable stem 19. When the ruptured line, or whatever caused the increased flow, is repaired, the retractable stem may be lowered into the throat of the Venturi to unseat the float, thereby enabling resumption of flow through the valve and the fluid system.

A reversal of flow will rapidly seat the float 13 in the entrance 7 to the tapered tube portion 9 as indicated by the dashed lines, thus halting any flow in the reverse direction. When fluid flow is restored in the system, flow in the forward direction will unseat the float 13 and the float will assume its equilibrium position at the entrance 22 to the Venturi portion 9.

Although it is preferred that the valve chamber be vertically oriented, exact vertical orientation is not necessary for operation of the valve as shown in FIG. 1. The guide rod 18 serves to align the float 13 and restrain the floats movements along the central axis, whereby operation of the valve may be maintained in a chamber which is not exactly vertically oriented.

Figure 2:
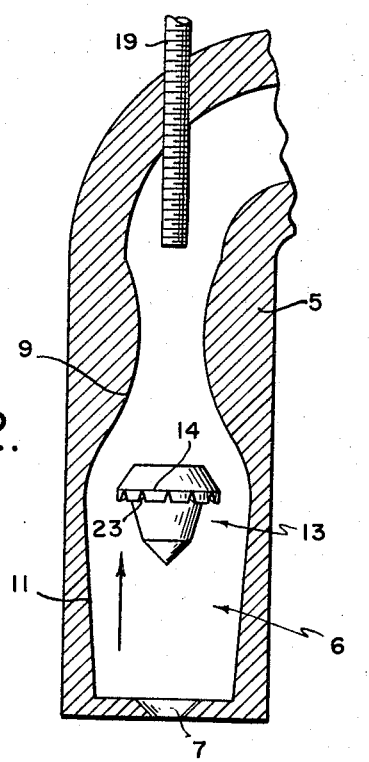
FIG. 2 is a view in longitudinal cross section of another version of the valve.

FIG. 2 shows another version of the valve according to the present invention wherein the float 13 is free-floating, i.e., it is not axially centered by a guide rod. The cylindrical medial portion 14 of the float 13 is provided with canted slots 23. The slots 23 are located about the periphery of the cylindrical portion 14 and are canted to both the transverse and longitudinal axes. Due to the positioning of the slots, fluid flow through the chamber 6 causes the float 13 to rise to its equilibrium position with a rotational movement. The rotation of the float then keeps the float axially centered and stabilized in the fluid stream.

Figure 3:
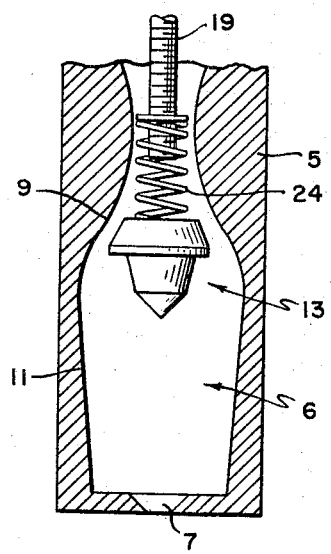
FIG. 3 is a view in longitudinal cross section of still another version of the valve according to the present invention.

FIG. 3 shows still another version of the valve wherein the valve may be spring loaded in a manner which permits variation of the maximum capacity of flow needed to seat float 13 in the throat 12 of Venturi portion 9. A spring 24 is attached to the lower portion of the stem 19, and extends below the lower extremity of the stem. The spring is lowered to a position below the upper seating surface of the valve chamber 6, i.e., below the throat 12 of the Venturi, thereby providing an adjustable force against the float 13. Depending upon the position of the float below the throat of the Venturi, the maximum capacity can be varied over a range of fluid flow rates. With the spring 24 in position, the valve is capable of performing the functions of a bi-directional check valve and a flow regulator. Upon an increase in fluid flow, the float 13 will rise from its equilibrium position 22 and move into contact with spring 24. The rising of the float will tend to reduce the flow rate due to the float being positioned in the Venturi section 11 of the chamber 6 where the cross sectional area of the chamber is reduced. Although the float 13 is in the Venturi pressure field, the spring 24 will keep the float from seating until a predetermined maximum flow rate has been reached. The valve, due to the spring loading, therefore acts as a flow regulator. This method of flow regulation can be used with either version of the valve, i.e., with the version shown in FIGS. 1 and 2.

The device of the present invention as shown by FIGS. 1, 2, and 3 is of simple construction and easily manufactured. Due to its simple design, the valve can be proportioned for any desired flow condition, and it is completely automatic. Other advantages flowing from the valve's design is that the valve can be made from a wide range of engineering materials and can easily be made in the form of replaceable tubes for insertion into pipe at any desired location. Finally, due to the valve's simple design, the valve of the present invention is practically trouble-free.

Obviously many modifications and variations of the present invention are possible in the light of the above teachings. It is therefore to be understood that within the scope of the appended claims the invention may be practiced otherwise than as specifically described.

What is claimed is:
1. A bi-directional valve for use in an essentially vertical portion of a fluid line comprising:
an essentially vertically oriented housing having an interior of varying cross-section forming a valve chamber;
a float axially positionable in said valve chamber;
said float having an upper surface shaped for seating in an upper portion of said chamber and having a lower surface shaped for seating in a lower portion of said chamber;
whereby said float prevents fluid flow through said valve chamber by seating in said upper portion of said chamber when said flow exceeds a predetermined limit and by seating in said lower portion of said chamber when said flow reverses;
means for unseating the float after it has been seated by excessive flow;
said valve chamber of varying cross-section being in the shape of two flow controlling chambers in series;
the lower section of the chamber being a tapered tube portion diverging in the direction of flow; and
the upper section of the chamber being a Venturi portion;
whereby said tapered tube portion and said Venturi portion are contiguous.
2. A bi-directional valve according to claim 1, comprising:
a hollow stem mounted above the Venturi tube portion;
a guide rod slidably mounted in said stem;
said rod being attached to the float;
whereby said guide rod maintains said float in axial alignment in the chamber.
3. A bi-directional valve for use in a vertical portion of a fluid line comprising:
an essentially vertically oriented housing having an interior of varying cross section forming a valve chamber;
an inlet to said chamber forming a first valve seat;
an outlet from said chamber forming a second valve seat;
a float axially positionable in said chamber;
said float having a first surface adapted to seat in said first valve seat and a second surface adapted to seat in said second valve seat;
whereby said float seats in said second valve seat when the fluid flow exceeds a predetermined amount and said float seats in said first valve seat when a flow reversal occurs;
an upwardly diverging tapered tube entrance portion; and
a Venturi shaped portion having an inlet contiguous with the outlet of said tapered tube portion, the inlet diameter of the Venturi being equal to and concentric with the outlet of said tapered tube;
whereby a vertical valve chamber is formed which is geometrically the shape of two flow controlling tubular portions in series.

References Cited

UNITED STATES PATENTS

| 383,877 | 6/1888 | Gale | 137—517 |
|---|---|---|---|
| 533,953 | 2/1895 | Holly | 137—533.21 X |
| 3,017,871 | 1/1962 | McKiney | 317—516.25 X |
| 3,055,391 | 9/1962 | Shuk | 137—516.25 |
| 3,106,226 | 10/1963 | Machen | 137—517 X |
| 3,141,331 | 7/1964 | Wilson | 73—209 |

FOREIGN PATENTS 14,369   3/1911   Denmark.

WILLIAM F. O'DEA, *Primary Examiner.*

HAROLD WEAKLEY, *Examiner.*